(12) United States Patent
Myers

(10) Patent No.: US 12,324,030 B2
(45) Date of Patent: Jun. 3, 2025

(54) SYSTEMS AND METHODS FOR ESTABLISHING AND OPERATING A RESILIENT AND LOW-LATENCY OUTBAND OVERLAY COMMUNICATION NETWORK

(71) Applicant: Wyld Networks Limited, Cambridge (GB)

(72) Inventor: Eugene Paul Myers, West Sussex (GB)

(73) Assignee: Wyld Networks Limited (GB)

(*) Notice: Subject to any disclaimer, the term of this patent is extended or adjusted under 35 U.S.C. 154(b) by 330 days.

(21) Appl. No.: 17/798,281

(22) PCT Filed: Feb. 12, 2021

(86) PCT No.: PCT/EP2021/053561
§ 371 (c)(1),
(2) Date: Aug. 8, 2022

(87) PCT Pub. No.: WO2021/160867
PCT Pub. Date: Aug. 19, 2021

(65) Prior Publication Data
US 2023/0113457 A1    Apr. 13, 2023

(30) Foreign Application Priority Data

Feb. 12, 2020 (GB) ..................... 2001939

(51) Int. Cl.
| | |
|---|---|
| H04W 76/10 | (2018.01) |
| H04W 12/06 | (2021.01) |
| H04W 16/22 | (2009.01) |
| H04W 40/24 | (2009.01) |
| H04W 64/00 | (2009.01) |
| H04W 84/18 | (2009.01) |

(52) U.S. Cl.
CPC ......... *H04W 76/10* (2018.02); *H04W 12/068* (2021.01); *H04W 16/22* (2013.01);
(Continued)

(58) Field of Classification Search
None
See application file for complete search history.

(56) References Cited

U.S. PATENT DOCUMENTS

| | | | | |
|---|---|---|---|---|
| 11,019,459 | B1* | 5/2021 | Goldberg | ............ H04W 84/045 |
| 2010/0041365 | A1* | 2/2010 | Lott | ...................... H04W 60/00 |
| | | | | 455/406 |

(Continued)

FOREIGN PATENT DOCUMENTS

EP    2 701 364    2/2014

OTHER PUBLICATIONS

Cheshire et al., DNS-Based Service Discovery RFC 6763, Internet Engineering Task Force, IETF; Standard, Internet Society (ISOC), Feb. 20, 2013, 49 pages, Geneva, Switzerland.

*Primary Examiner* — Eunsook Choi
(74) *Attorney, Agent, or Firm* — Thorpe North & Western, LLP

(57) ABSTRACT

The invention comprises a method for establishing and operating a resilient and reliable overlay ad-hoc communication network of heterogeneous end devices, comprising the steps of sending (200) a connection request signal by respectively each end device; establishing (201) pairwise connection links between at least a selection of the end devices under usage of the connection request signals thereby creating the ad-hoc communication network, characterised in that a policy is applied (202), providing a set of rules indicating the discovery and connection criteria for establishing (201) pairwise connection links and routing; as well as operating (203) an underlying real-time information streaming network platform using the created ad-hoc communication network. The invention also comprises a system arrangement of the foregoing method, as well as an end (Continued)

device to operate the method and a computer program likewise programmed as such.

21 Claims, 1 Drawing Sheet

(52) U.S. Cl.
CPC ....... *H04W 40/246* (2013.01); *H04W 64/003* (2013.01); *H04W 84/18* (2013.01)

(56) References Cited

U.S. PATENT DOCUMENTS

| | | | |
|---|---|---|---|
| 2011/0085494 A1* | 4/2011 | Ji | H04L 47/32 370/328 |
| 2011/0093913 A1* | 4/2011 | Wohlert | H04L 63/0861 726/1 |
| 2014/0171119 A1* | 6/2014 | Fraccaroli | H04W 84/18 455/456.3 |
| 2015/0099469 A1* | 4/2015 | Goldstein | H04M 1/72412 455/41.2 |
| 2016/0021511 A1* | 1/2016 | Jin | H04W 4/02 455/457 |
| 2016/0088424 A1* | 3/2016 | Polo | H04W 88/04 455/41.1 |
| 2017/0251347 A1* | 8/2017 | Mehta | H04W 4/08 |
| 2018/0288008 A1* | 10/2018 | Ganesan | H04L 9/3263 |
| 2019/0289539 A1* | 9/2019 | Lee | H04W 84/18 |
| 2019/0373536 A1 | 12/2019 | Jayawardene et al. | |
| 2020/0314247 A1* | 10/2020 | Klingler | H04M 3/54 |

* cited by examiner

SYSTEMS AND METHODS FOR ESTABLISHING AND OPERATING A RESILIENT AND LOW-LATENCY OUTBAND OVERLAY COMMUNICATION NETWORK

This invention is directed towards methods for establishing and operating an outband mobile ad hoc network (MANET) overlaid upon a real-time stream supporting Wi-Fi (WLAN) and Cellular (WWAN) communications, for heterogeneous user equipment and Internet-of-Things (IoT) devices, collectively referred to as "Devices". The present invention is directed in particular to resilient and/or low latency outband mobile ad hoc networks. The present invention is directed in particular to mobile devices, such as mobile telephones, tablets and the like.

Mobile Network Operators (MNOs) are struggling with the problem of accommodating the current demands of mobile users, wherein new, data-intensive applications are used with increased frequency and/or intensity during the daily routines of the mobile device users. The rapidly increasing number of IoT devices will pose a further strain on the requirements of contemporary and next generation Wi-Fi and cellular networks (NGNs), thereby compounding the problem. Device-to-Device (D2D) communication is one of the paradigms that is and will increasingly be an important component in next generation cellular technologies and will likely be looked to as a solution in some circumstances to this problem.

In a conventional cellular system, devices are not permitted to directly communicate with each other in the licensed cellular bandwidth; rather all communications take place through Base Stations. D2D communication in cellular networks is defined as direct communication between two mobile users without traversing the Base Station or core network. D2D communication is opaque to the cellular network and it can occur on the cellular spectrum (or Inband), or on the unlicensed spectrum, (or Outband).

An Overlay Network is a virtual network that is built on top of a physical underlying network infrastructure to which it provides a handoff to its services, whilst the Underlay Network is responsible for the traditional over-the-top delivery of packets across networks.

A D2D link connects a transmitter piece of user equipment with its intended receiver piece of user equipment, resulting in a single-hop communication. One can also have a multi-hop network composed of D2D links that form a MANET or what is often more informally referred to as a "mesh" or "mesh network" of interconnected devices. A multi-hop network facilitates the delivery of the data by hopping through multiple intervening nodes. It is these multi-hop networks with which this application is concerned.

The system described herein is a complete overlay system, that also securely manages the handoff of information between the overlay and underlay networks.

It is these problems amongst others that the present invention seeks to solve.

SUMMARY OF THE INVENTION

According to a first aspect of the present invention there is provided a method for establishing and operating a resilient and reliable ad-hoc communication network of heterogeneous end devices, comprising the steps: sending a connection request signal by respectively each end device; establishing pairwise connection links between at least a selection of the end devices under usage of the connection request signals thereby creating the ad-hoc communication network, characterised in that a selection policy is applied, the selection policy providing a set of rules indicating the connection criteria for establishing pairwise connection links; and operating a real-time information streaming network platform using the created ad-hoc communication network.

This method provides establishing and operating a resilient and reliable communication network of heterogeneous end devices, comprised of a resilient outband underlay network and an overlay solution that incorporates a multi-channel real-time streaming gateway that provides a number of services, such as Geolocation intelligence, Policy creation and distribution, User authentication, presence and security, and Event-based content.

Accordingly, the present invention provides methods for establishing and operating a resilient and low-latency hybrid communication network, which can be operated reliably and efficiently.

The overlay network is said to be ad hoc because it does not rely on a pre-existing infrastructure, such as routers in wired networks or access points in managed (infrastructure) wireless networks but is rather structured from the devices at hand, and because the network is formed and dismissed on-demand, it is advantageously continuously self-configuring, self-organizing, and self-healing.

The outband, ad hoc, overlay MANET assures that sustainable connectivity is provided and the communication connections between devices are reliable, regardless of whether the device nodes are static or dynamic, or transient or persistent.

The present invention utilises this terminology and methodology, although it is said to be multi-RF or Multi-channel, because it also supports multiple Outband Radio Access Technologies (RAT) such as Bluetooth Classic (BT), Bluetooth Low Energy (BLE), Wi-Fi Direct and Apple Wireless Direct Link (AWDL). Technologies such as link adaption and adaptive routing make the selection and settings of the RAT and these advantageously help to keep the transport layer opaque.

Since the MNOs do not have an unlimited frequency spectrum, they are concerned about how well the spectrum assets are utilised, often measured as "spectral efficiency", or a channel's ability to carry information given fixed bandwidth. By offloading communication to the D2D communications or a multi-hop MANET, from the core network, the MNO's system capacity improves, thus increasing spectral efficiency. Also, because of the shorter signal traversal path and faster connection negotiation, ultra-low latency communication is possible, supporting a rich "edge network" of services. An edge network is commonly defined as a network located on the periphery of a centralized network. The edge network feeds the central, or core, network.

In this context, the present invention also provides an end device arranged to operate the method which is moreover arranged to take part as a component in the suggested system arrangement. Likewise, a system which is arranged to perform the method and moreover, a computer program product arranged to perform the method shall be provided.

The present invention therefore provides the advantages that it will improve the reliability of communications between the devices, enhance spectral efficiency and system capacity, and reduce latency within the networks.

Accordingly, uses and embodiments of the invention are many and especially include but are not limited to the following: first, smart notifications in a public transportation context—for example providing disruption information on an underground or overground train system; second, disaster relief—here the invention will enable users to get messages through to one another in a context of network disruption, collapse or absence; third, a civic scenario involving a crowd, where bandwidth is limited by the density of device users—the invention could be used to promulgate public safety messages at a public assembly such as a protest march, or in a commercial context, such as a stadium or large outdoor event, where it could be used to take orders from or drive advertising messages to people. Fourth, it could be used in the context of a cluster of shops such as indoors in a mall or outdoors in a town centre, distributing marketing information regarding nearby deals and loyalty schemes. Fifth, it has a market research use, in that it can be used to discover product buying patterns and dwell times at particular location, for example advertising or retail sites.

The invention harnesses the power of the crowd; it provides the operator with a large number of data points providing situational intelligence to a given operator, which could for example have further utility in disaster relief, for example.

On a higher level of generality, the invention can be said to provide a higher level of service and a better experience to the user.

The software required to operate the D2D Mesh may be provided as an application downloadable onto a mobile device, wherein the application is built from a Software Deployment Kit (SDK) that delivers the user security functionality, the connection to the server-side broadcast Gateway, the handoff of data between the gateway and the ad-hoc mesh network, the formation of the ad-hoc mesh network, and assorted services that provide user location context. The invention may also comprise a number of computer programs arranged to perform further overlay services outlined further on, when being executed on a computer, that are available via a real-time streaming gateway.

In accordance with the first aspect of the present invention, preferably, sending the connection request signal is performed using browsing and/or advertising. In particular, there may be provided a peer-to-peer network, where the network topology supports multiple peers, and is essentially a collection of two or more peers connected to each other via a networking session. The advertisers and browsers facilitate the discovery and creation of sessions. When a peer wishes to notify other devices that it wants other peers to connect to it, it advertises its service. A browser is used to discover nearby peers that are advertising a service. A peer may advertise and browse at the same time.

Preferably, at least one end device comprises a server providing information items to be shared among further end devices.

Preferably, information items are forwarded between the end devices, wherein the forwarding is informed relative to consideration of information item characteristics and/or context information provided using at least one end device.

Preferably, information item characteristics comprise at least one of a time-stamp, a version number, a file size, an expiry date and information regarding priorities.

Preferably, context information comprises at least one of location information, movement information, signal strength, personal user information, a user input, a bandwidth, a hardware resource, a communication restriction and/or an end device configuration.

Preferably, the set of rules indicating the connection criteria comprises at least one of a bandwidth, an operating system, an end device configuration, distance information and/or location information.

Preferably, the real-time information streaming network platform provides control instructions for mutual data exchange between pairwise end devices.

Preferably, location mapping is undertaken at the edge. Preferably the following ways to map location are provided: GPS/aGPS, Beacon, Connection Mapping, and Collective Positioning.

Preferably, the real-time information streaming network platform provides at least one of end device authentication functionality, message encryption functionality, certificate management functionality, password management functionality, hashing functionality and signature functionality.

Preferably, an interface is provided, which allows interoperability with implemented frameworks. Preferably, device interoperability is achieved via MDNS. Preferably, two incompatible systems are bridged by local Wi-Fi.

Preferably, a device acts as a hotspot permitting others to connect and exchange data with and through the hotspot.

Preferably, the method is implemented using at least one communication protocol.

Preferably, at least a selection of provided method steps is performed iteratively thereby forming a dynamic ad-hoc network on demand.

Preferably, the connections are anonymized and/or geofenced and comprise a unique identifier; optionally wherein a one-time password is used to register and then link the devices.

Preferably, the ad-hoc network can reconstitute and reconfigure itself, utilising a plurality devices selected from mobile devices, static beacons, and in situ routers.

Preferably, hosts on the network are assigned IP addresses that uniquely identify them to other devices on the same network.

Preferably, DNS-SD provides the service discovery functionality in the network, which is a peer-to-peer network.

Preferably, a device can advertise and browse at the same time. Preferably, the device chooses to advertise or browse using Evolutionary Game Theory (EGT) to categorize whether a node should operate on a selfish or altruistic strategy.

Preferably an in-memory database is provided to keep track of device presence and optionally comprising a consistent hashing algorithm to scale redistribution horizontally.

Preferably, software required to operate the method is provided as an application downloadable onto a mobile device, wherein the application incorporates an Assessment and Deployment Kit (ADK) that enables the generation of public keys on both a server side and the device side.

In a second broad independent aspect, the invention comprises an end device arranged to operate the method according to the first aspect of the present invention.

In a third broad, independent aspect, the invention comprises a system arrangement for establishing and operating a resilient and reliable ad-hoc communication network of heterogeneous end devices, comprising interfaces arranged to send a connection request signal by respectively each end device, a linking unit arranged to establish pairwise connection links between at least a selection of the end devices under usage of the connection request signals thereby creating the ad-hoc communication network, characterised by a selection unit arranged to apply a policy, providing a set of rules indicating the discovery and connection criteria for establishing pairwise connection links and routing; as well as at least one processor module arranged to operate an underlying real-time information streaming network platform using the created ad-hoc communication network.

In a fourth broad independent aspect, the invention comprises a computer program product being arranged to perform the method above, when being executed on a computer.

In a fifth broad, independent aspect, the invention comprises methods for establishing and operating a service that underlays the ad-hoc network and providing a gateway to a number of services to augment the overlay ad-hoc network and establishes user presence; that is, the ability to know when a user is on-line or when last seen, and optionally information about their location, and how they are connected (e.g., WWAN, WLAN, D2D). Understanding user presence is a critically important aspect of any communication system and an essential productivity attribute.

In a sixth broad, independent aspect, the invention comprises methods for scheduling and distributing information and content on the ad-hoc mesh. It is this aspect that facilitates the multi-hop propagation of the data throughout the ad-hoc network. This aspect of the invention is extensible or software defined, or more precisely, it is policy defined. The invention supports methods that enable different data propagation strategies depending upon the business domain and specific use cases.

In a seventh broad, independent aspect, the invention comprises methods and services both at the network edge in the overlay ad-hoc network and via the underlay network that is exposed via the gateway, to provide enhanced location context, so that information is only presented to the user if relevant to the user's current location or transient history.

In an eighth broad, independent aspect, the invention utilizes a number of methods for establishing and operating a secure environment for its users, providing methods for ensuring privacy, authentication, integrity and non-repudiation, as well providing a system that can be securely defined by policy (e.g., a digitally signed contract).

In a ninth broad, independent aspect, the invention comprises methods for establishing and maintaining interoperability between heterogeneous devices, comprising the steps to discover and connect devices from disparate device manufacturers, overcoming proprietary design issues.

BRIEF DESCRIPTION OF THE DRAWINGS

The invention will be described in detail with reference to the accompanying figures of which.

DETAILED DESCRIPTION OF THE PREFERRED EMBODIMENTS OF THE INVENTION

The preferred embodiments of the invention will now be described in detail.

It is commonly known in the art, specifically as applied to Bluetooth (RTM) technology, to create a mesh topology by interconnecting devices, or nodes, without a central or single point of failure. A piconet is the type of connection that is formed between two or more device nodes. A scatternet is a type of ad hoc computer network consisting of two or more piconets. A device node can be connected to two piconets, simultaneously. The node that initiates the session becomes the Master; each device can have up to seven direct connections, or Slaves. Therefore, a piconet can have up to eight nodes. A node can be Master of its own piconet while a slave of another.

Figure 1:
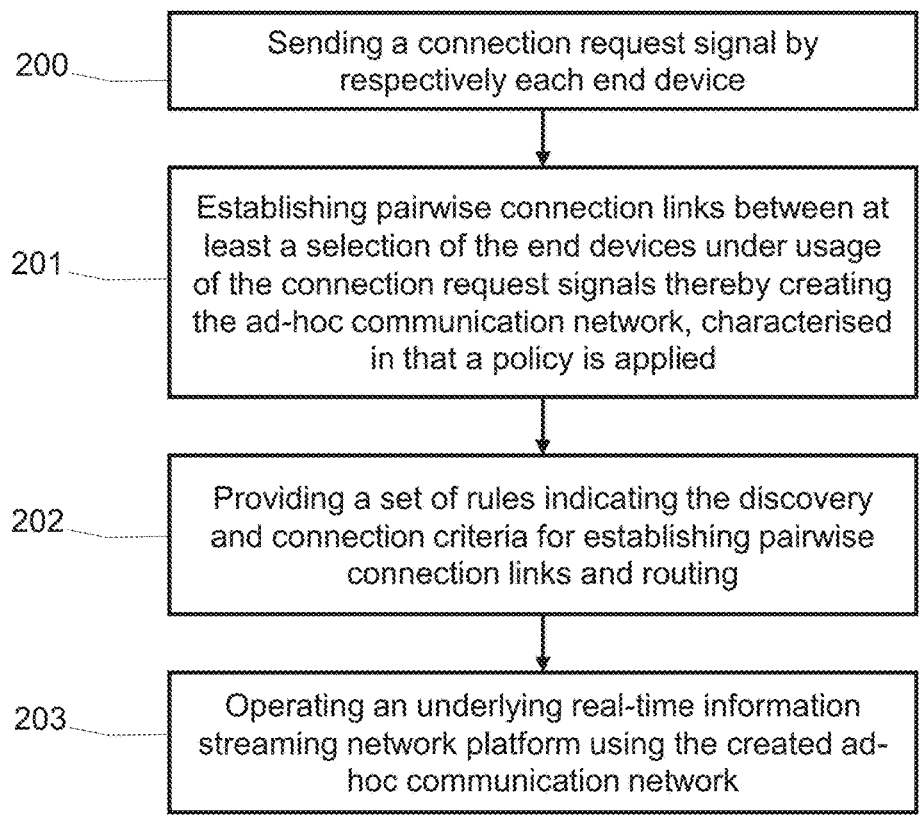
FIG. 1 is a flow chart of the method of the present invention.

FIG. 1 shows a flow chart depicting the method for establishing and operating a resilient and reliable ad-hoc communication network of heterogeneous end devices, comprising the steps of sending 200 a connection request signal by respectively each end device; establishing 201 pairwise connection links between at least a selection of the end devices under usage of the connection request signals thereby creating the ad-hoc communication network, characterised in that a policy is applied 202, providing a set of rules indicating the discovery and connection criteria for establishing 201 pairwise connection links and routing; as well as operating 203 an underlying real-time information streaming network platform using the created ad-hoc communication network.

Device Discovery & Resolution

Sending the connection request signal is performed using DNS-SD. Preferably, at least one end device comprises a server providing information items to be shared among further end devices.

At least a selection of provided method steps is performed iteratively thereby forming a dynamic ad-hoc network on demand.

The ad-hoc network, alternatively referred to as a mesh, can reconstitute and reconfigure itself, utilising a plurality devices selected from mobile and static devices, static beacons, and in situ routers.

It is commonly known in the art, to provide mesh formation through name resolution and service discovery on a local link, commonly known as Zero-Configuration Networking, which will now be described.

Once the L2/L3 Data Link Network layers have been established, the present invention utilises Zero Config Networking which may preferably subsist on L4 (Transport layer), which is primarily comprised of the IETF standard technologies namely Local Link Addressing (RFC 3927), mDNS (RFC 6762), and DNS-SD (DNS-service discovery) (RFC 6763). mDNS and DNS-SD are used for network health monitoring and self-healing. For example, in an underground use case, wherein a mesh is formed by mobile devices on a train platform (with people constantly entering and exiting the platform area and therefore the mesh), the mesh keeps having to reconstitute and reconfigure itself, utilising a large number of mobile devices and in some circumstances also static beacons or in situ routers for the distribution of updated information, as it enters the network on the mobile devices of users entering the platform area.

Hosts on a network are assigned IP addresses that uniquely identify them to other devices on the same network. mDNS and DNS-SD provides the service discovery functionality in the network, which is a peer-to-peer network.

DNS-SD allows clients to discover a named list of service instances, given a service type, and to resolve those services to hostnames using standard DNS queries. The specification is compatible with existing unicast DNS server and client software but works equally well with mDNS in a zero-configuration environment. Each service instance is described using a DNS SRV (RFC 2782) and DNS TXT (RFC 1035) record. A client discovers the list of available instances for a given service type by querying the DNS PTR (RFC 1035) record of that service type's name; the server returns zero or more names of the form "<Service>.<Domain>", each corresponding to a SRV/TXT record pair. The SRV record resolves to the domain name providing the instance, while the TXT can contain service-specific configuration parameter. A client can then resolve the A/AAAA record for the domain name and connect to the service.

mDNS is a protocol that uses packets similar to unicast DNS except sent over a multicast link, in order to resolve hostnames. Each host listens and resolves requests for the DNS record of its .local hostname (e.g., the A, AAAA, CNAME) to its IP address. When an mDNS client needs to resolve a local hostname to an IP address, it sends a DNS request for that name to a well-known multicast address; the computer with the corresponding A/AAAA record replies with its IP address. The mDNS multicast address is 224.0.0.251 for IPv4 and ff02::fb for IPv6 link-local addressing.

(DNS-SD) requests can also be sent over a multicast link and it can be combined with mDNS to yield zero-configuration DNS-SD. Although it still uses DNS PTR, SRV, TXT records to advertise instances of service types, domain names for those instances, and optional configuration parameters for connecting to those instances, nonetheless SRV records can now resolve to multicastable .local domain names, which mDNS can resolve to local IP addresses.

By default, mDNS exclusively resolves hostnames ending with the .local top-level domain (TLD). This can cause problems if that domain includes hosts which do not implement mDNS but which can be found via a conventional unicast DNS server. Resolving such conflicts requires network-configuration changes that violate the zero-configuration goal. Hosts on a network must be assigned IP addresses that uniquely identify them to other devices on the same network. On some networks there is a central authority that assigns these addresses as new devices are added. Mechanisms have therefore been introduced to handle this task automatically providing address autoconfiguration, which allows a device to determine a safe address to use. For link-local addressing IPv4 versions use the special block 169.254.0.0/16 as described in RFC 3927 while IPv6 hosts use the prefix fe80::/10. More commonly addresses are assigned by a DHCP server, often built into common networking hardware like computer hosts or routers. Most IPv4 hosts use link-local addressing only as a last resort when a DHCP server is unavailable. Networks are uniquely named and require registration in the Internet Assigned Numbers Authority (IANA) Service Name and Transport Protocol Port Number Registry, and mDNS provides name resolution.

DNS-SD provides the service discovery functionality in this network, which is a peer-to-peer network. The network topology supports multiple peers, and is essentially a collection of two or more peers connected to each other via a networking session. Facilitating the discovery and creation of sessions are advertisers and browsers. A peer is a node in a session and is assigned, a Session ID, associated temporally with a given device's Globally Unique Identifier (GUID), this latter identifier having been assigned to the Device during installation and provisioning.

When a peer wishes to notify other devices that it wants other peers to connect to it, it advertises its service. A Browser is used to discover nearby peers that are advertising a service. A peer can advertise and browse at the same time, although this will have an impact on the amount of energy that the process takes, as advertising mode governs the energy consumption, and can cause interference.

The present invention provides a method for establishing whether to advertise or browse, using Evolutionary Game Theory (EGT) to categorize whether a node should operate on a selfish or altruistic strategy. The concept of Evolutionary Game Dynamics describes how the frequencies and likelihoods of different strategies subsist within a population at a given time and how those frequencies and likelihoods might change as populations change and also according to the strategies' success.

In order for a network to be efficient, most if not all nodes must be connected. Advertising improves the performance of the network yet comes at a cost; advertising uses energy and drains the device's battery. The choice as to whether to advertise or not, and how much and when to advertise are best analysed using EGT. A fitness function is defined to model the game for the network. The fitness function describes the payoff each node will receive for the strategy it follows. The input for fitness can be battery strength and/or signal strength to nodes or the gateway and also relates to the evolution, or maturity of the network.

Once the Service Discovery, via DNS-SD, is concluded, the connection is established. The connection maintains until XXX, where XXX is the name for the method that defines the rules for how long a connection should be maintained. The method and rules are in turn definable by policy. Once the connection is established, each node utilizes mDNS services to help manage the L4 Transport Layer connectivity between devices.

A device can advertise and browse at the same time. Preferably, the device chooses to advertise or browse using Evolutionary Game Theory (EGT) to categorize whether a node should operate on a selfish or altruistic strategy, depending on the energy resource available to the device.

In particular, there may be provided a peer-to-peer network, where the network topology supports multiple peers, and is essentially a collection of two or more peers connected to each other via a networking session. The advertisers and browsers facilitate the discovery and creation of sessions. When a peer wishes to notify other devices that it wants other peers to connect to it, it advertises its service. A browser is used to discover nearby peers that are advertising a service. A peer may advertise and browse at the same time.

System Overlay and Underlay Aspects

Figure 2:
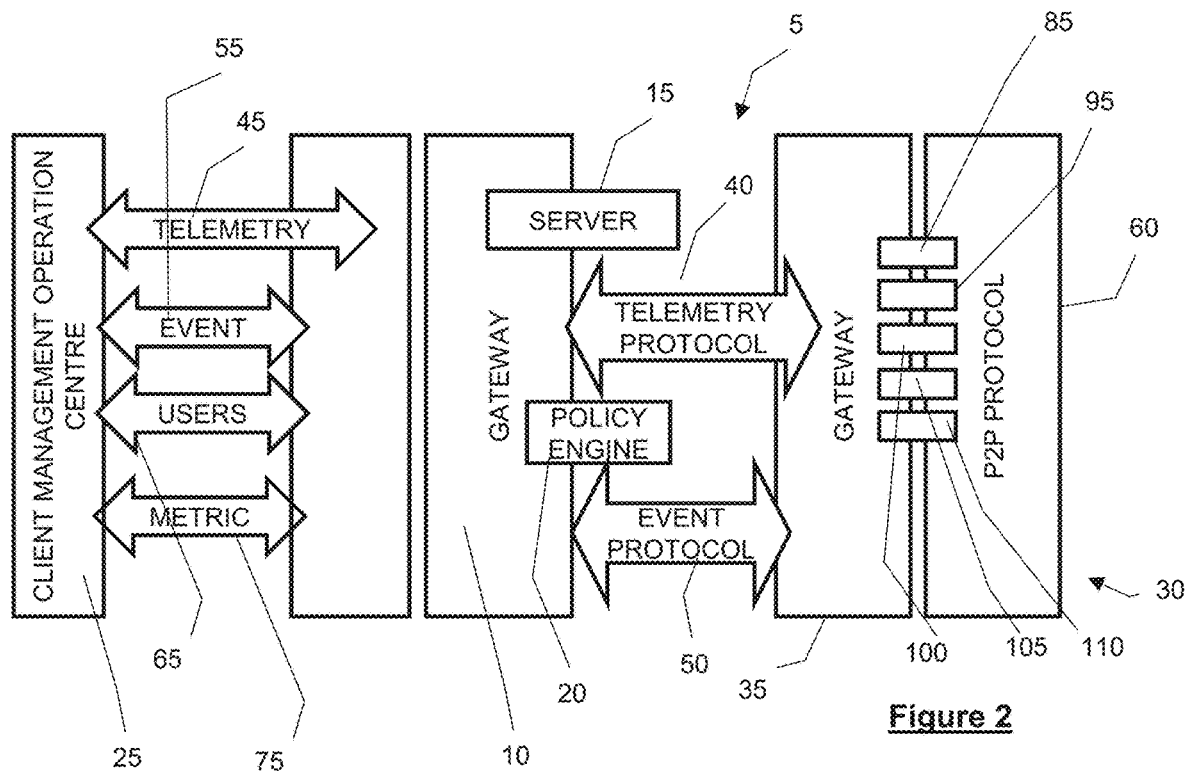
FIG. 2 is a block diagram representation of the suggested system arrangement for establishing and operating a resilient and reliable ad-hoc communication network according to an aspect of the present invention.

In FIG. 2, there is shown a platform, generally indicated 5, comprising a gateway 10 which acts with a server 15 for introducing information items. Platform 5 is further in communication with a client management operation centre 25 with which it exchanges telemetry 45, event 55, users 65 and metric 75 information.

The platform 5 shown in FIG. 1 is an agglomeration of services useful to the context of implementation—typically it comprises a Logging service, a Geofencing service, in some embodiments a Geolocation service, ingress services, user services, events and notification. The platform allows for the control of the relationship between the mesh and what it carries.

The server 15 may provide a policy engine 20 and accordingly adapt and manage a rule set. A further end device, generally indicated 30, is shown, which comprises respective modules and having a gateway 35. Protocols, comprising telemetry protocol 40 and event protocol 50 can be established to manage communication between the gateway 10 and the gateway 35 of end device 30. The telemetry protocol 40 deals with context and the event protocol 50 governs what's delivered. The gateways 10, 35 are cached; they back up when not connected. The gateway 35 is supplemented by device to device "P2P" protocols 60. This "P2P" protocol 60 partitions tasks or workloads among peers, and includes Device-to-Device discovery 85, Multi-hop/OTT routing 95, Geospatial service 100, Policy Engine 115, Client OTT Gateway/Bridge 110.

Message Scheduling and Distribution

Information item characteristics comprise at least one of a time-stamp, a version number, a file size, an expiry date and information regarding priorities.

Forwarding information items between the end devices is informed relative to consideration of information item characteristics and/or context information provided using at least one end device.

The present method very effectively creates ad-hoc personal area mesh networks according to a further aspect of the present invention, on-demand, overlaying on rich on-demand real-time streaming platform, so that the users get information on-demand, and on-time. It is a method of scheduling information, using a variety of different tools. It is termed a "Multi-dimensional mesh" but (and because) it is more than a conventional mesh network and does not rely on mesh in isolation. It recognizes the shortcomings of various communications methodologies and overlays them in an optimized fashion in order to make for a stronger system.

According to a further aspect of the present invention at least one end device is formed by a server providing information items to be shared among further end devices. This provides the advantage that the established ad-hoc network comprises at least one data source and consequently, this entity provides the information to be shared. Once the information is issued by the server the end devices can forward this information and distribute it over the network or at least to specific entities. Hence, a connection between the server and the further ad-hoc network can be established once and for the further distribution of the data this connection is no longer required.

A user may for instance download specific content while an internet connection to a server is established. Once the transmission area of a telecommunication network is no longer available for instance because the end devices is carried underground the end devices can share the information themselves. For example, new users may enter an underground station and provide data which they have gathered overground and share these updates with further entities although no mobile telecommunication network infrastructure is available underground. Hence, new data items enter the ad-hoc network.

Scheduling of data delivery is software defined and sits at application layer. (>L4) Scheduling may be done via Bitflag and can be done by either time stamp alone or through a more sophisticated use of context, matching a given device to a policy. A given policy is signed and it therefore has both contractual and identification weight. This serves to tie everything together through the Keychain, which is discussed below under authentication.

Messages can originate from the management interface of the platform, for use cases such as underground metro systems and public transport.

The present policy engine allows to specify triggers and actions for specific users, so when creating messages, one of more policies can be assigned to enable distribution of messages to specific users or groups of users. Other attributes of the policy can also be defined, such as priority, weight, if the messages should be shared, and what type of routing.

Once the messages arrive on the device, if the policy allows them to be shared, the messages can be distributed to nearby devices or multi-hopped to other devices.

A TTL or max number of hops can be defined in the policy.

When a new message arrives via the OTT Client Gateway, all other connected nodes are queried. A number of multi-hop strategies can be used, include Most Recent, Evolutional Maturity, Nearest Neighbour, or Merkle-Tree.

When a message arrives by D2D connectivity, its TTL and hops are checked and if appropriate, all other nodes are queried.

If a message originates on a device, policy can dictate whether the message and propagate up through the Client Gateway and down the Server Gateway and back out though the server, querying the connected devices/users specified by the policy.

Gateway and User Presence

The system further comprises a policy driven bridge, located between the mesh at L9 and the Gateway client in the mobile agent, which allows, denies, and/or weights all traffic between the mesh and a secure gateway, delivering digitally signed control and content data. The Secure Gateway of the present invention provides a means for real-time streaming of rich data and services, to the Gateway client on each device, which serves to provide a bridge for the flow of data to the Ad hoc Mesh network.

An in-memory database is provided to keep track of device presence and utilising a consistent hashing algorithm to scale in-memory database distribution horizontally.

The invention comprises a system arrangement for establishing and operating a resilient and reliable ad-hoc communication network of heterogeneous end devices, comprising interfaces arranged to send a connection request signal by respectively each end device, a linking unit arranged to establish pairwise connection links between at least a selection of the end devices under usage of the connection request signals thereby creating the ad-hoc communication network, characterised by a selection unit arranged to apply a selection policy, the selection policy providing a set of rules indicating the connection criteria for establishing pairwise connection links; and at least one processor module arranged to operate a real-time information streaming network platform using the created ad-hoc communication network.

The invention comprises a computer program product being arranged to perform the method above, when being executed on a computer.

Beside delivering auditable content, the Gateway is also able to process real-time network telemetry data, without compromising the user's privacy.

The present invention also provides a method and system for the fast, efficient maintaining and lookup of any and all users' presence. The system is focused on providing a fast, efficient highly central Presence authority, which also acts as an authentication delegate.

Besides being detected as present or otherwise, a variety of ancillary data may be associated with a given node, such as its geographic location, friendly name, connectivity and other attributes. It is a node's location, given the highly transient nature of mobile devices, that deliver its most important context data.

The invention may use an in-memory database, to keep track of device Presence and further may use a bespoke consistent hashing algorithm to scale redistribution horizontally.

Messages that that are sent over the Real-time gateway and Device to Device via the Mesh overlay, are digitally signed, and these keys are also maintained locally; therefore, a device only needs to listen when we know where it is from—the method advantageously builds in a central authority aspect.

The server-side gateway Gateway uses websockets to provide real time OTT (underlay) when the device is able to connect to the internet.

When a mobile device authenticates and connects to the server-side gateway, an entry is created for 'n' horizontally scaled in-memory databases.

A consistent hash value is calculated based on the devices UUID, determine which server the entry is placed.

When the value is stored, a Time To Live (TTL) of 'n' seconds is assigned to the stored value (15 secs for example).

Every 'n' seconds, (15 seconds for example) each of the servers "ping" their respective devices (by DIUID), and when a "pong" response is received, the TTL value for that DIUID is extended by another 'n' seconds (15 seconds for example).

When an entry is expired, the user's persistence record is updated to their last seen time.

Devices and management portals can query the user's presence, which reads through to the persistent store for the last seen data if there is not an entry in the in-memory database.

Other relevant telemetry data, such as connectivity type, geolocation information, latency figures, proximity, etc, can be added to the in-memory store and written through to the persistent store as available.

The invention offers the following marked technical advantages over extant technologies, which are grouped at the end of the description for ease of reference.

First, as shown in FIG. 1, it advantageously operates in several important aspect in "Real time". The Ad-hoc mesh networks overlay the real-time platform; hence a real-time gateway distributed service is designed that is reinforced according to a further aspect of the present invention, or overlaid, with the resilient Device-to-Device multi-hop software-defined system. The real-time streaming gateway in the Autonomous Agent SDK 30 speaks to the Gateway 10, 35. The Gateway 10, 35 in the SDK has intelligent features which when combined with the highly scalable backend system that include the presence service, and a number of well-designed protocols, provides a high level of service with just the gateway alone.

Connectivity to the Gateway 10, 35 may come and go, often very rapidly in challenging environments. There are two gateways 10, 35 and the gateways are both designed and executed to handle this well, not only proving real-time information, but also gathering real-time presence information, quickly, privately, and securely. Data can travel through both, or not, and that is one aspect that is secured and defined by policy according to a further aspect of the present invention. These policies enable the present system to operate better than they would if they were just software defined.

Second, the proposed system and method is very "Resilient", being both Self-healing and self-restarting: in particular, the device-to-device multihop mesh embodies this advantage being a scatternet with no single point of failure. The queueing function and the gateway's caching function can be seen as similarly advantageous, because they allow for delivery of info after network healing, for example.

Third, the proposed system and method ensure the data which flows along the network remains "Relevant"—be that Situational Context, knowing when the device is moving, the time, Geolocation and GPS services or use of beacons. Basic data such as time, location, connectivity, presence and history are transmitted although some histories never leave the device and are secured via in preferred aspects the addition of a key and the Software Defined aspect focuses on making the situation context apply towards the ongoing definition of the network.

Fourth the proposed system and method provide matter which is "Respondable"—in other words, something to which a device will respond to which itself need not be on the mesh but could be introduced via another part of the platform or not at all and a response can be made via the gateway, or another way. The fusion software platform is the part of the system which allows action, in that it takes context and allows decisions to be made on it prior to delivery.

Fifth, the proposed system and method are secure. In preferred embodiments, it is possible to encrypt data packets, but since personal information is not being sent, this is not mandatory.

Location Context and Relevance

Preferably, context information comprises at least one of location information, movement information, signal strength, personal user information, a user input, a bandwidth, a hardware resource, a communication restriction and an end device configuration.

Preferably, the connections are anonymized and/or geofenced and comprise a unique identifier.

Preferably, the set of rules indicating the connection criteria comprises at least one of a bandwidth, an operating system, an end device configuration, distance information and location information.

Preferably, the real-time information streaming network platform provides control instructions for mutual data exchange between pairwise end devices.

Preferably, location mapping is undertaken at the edge. Preferably the following ways to map location are provided: GPS/aGPS, Beacon, Connection Mapping, and Collective Position.

Connections are anonymized with a session token that is discarded after the session has ended.

The system checks the policy to determine if it should try to resolve the location from GPS, from known Bluetooth beacons, a list of known Wi-Fi hotspots, and/or use data collected from other devices nearby.

The system tries to obtain a location from each of the allowed sources, and if assuming all are allowed first with BT beacons, then Wi-Fi Hotspots, then GPS, then nearby users.

If at least three Beacons and/or Hotspots are found from the known list their RSSI values are determined, and a Kalman filter algorithm is applied to each. From the RSSI value a distance is derived. Beacons are preferred over hotspots.

A trilateration algorithm is applied to Beacons and/or Hotspots values and a location is determined by lookup.

The accuracy of the Beacon/Hotspot measurement is determined from a constant logarithmic multiplier of the derived from the RSSI value. For example, an accuracy of 0.1 meter is used for a one-meter distance, with the most inaccurate of 8 meters for greater than 10-meter distance.

If neither a Beacon or Hotspot location is determined and GPS is configured, the GPS location is determined along with an accuracy. A Kalman filter algorithm is applied to the GPS data.

Assuming a retuned value from at least one of the three sources, we should now either have a sensor derived location.

If collective positioning is configured, and there are connections with at least two other devices, a collaborative filter algorithm is applied, else if just a single nearby device is found, the RSSI value from that device, is applied to their location to determine a location with an accuracy of a multiple of the filtered accuracy.

If a sensor-based location and a collaborative filter/nearby location are determined, the value with the best accuracy is used though both values are persisted.

Security—the Credential Chain and Policy

Preferably, the real-time information streaming network platform provides at least one of end device authentication functionality, message encryption functionality, certificate management functionality, password management functionality, hashing functionality and signature functionality.

The system utilizes a number of geospatial services to provider user location context, including Operating System provided geofencing capabilities, Server-side geofencing, Beacon positioning, Pseudo-Beacon positioning (e.g.—Wi-Fi Hotspot reckoning), and Collective Positioning, that is, determining the distance to other nearby directly connected devices by measuring the Signal (RSSI) strength, and using Trilateration to improve and augment location data determined by other means, most significantly Assisted GPS.

Rather than transmit a device's latitude and longitude data, when a location is hit, the signal the server though so that metrics can be taken, and it updates the in-memory-user-details linked to the node in the presence graph reference to an in-memory table where the real-time metrics for each geofence are tracked.

This advantageously benefits the user by preserving the privacy which would otherwise be lost if latitude and longitude data was transmitted.

The system performs geofence calculations at the edge in real-time. The system can also share information with other nearby nodes; this sharing is limited to L4 connectivity but does include direct and multi-hop connection. When locations are sent, they are also hashed, for the purpose of data security. Collective positioning is undertaken at the edge. OS Geofencing means personal data never leaves your device.

The system comprises three main ways to map location; GPS/aGPS, Beacon, Connection Mapping, and Collective Positioning. One function of the invention is to keep track of presence/absence and location.

Authentication of users is done in the following manner. The relevant software required to operate the present application may be provided as an application downloadable onto a device such as a mobile telephone First, at the time the user downloads and installs an application that incorporates the Software Development Kit (SDK) according to the present invention, a sequence begins that enables the generation of public keys on both the server side and the device side. The system utilizes a central authority in the first instance—onboarding the device and generating the first iteration of the key. From then on, the key is kept on the device only—providing privacy and security advantages. Subsequently, security is managed using the defined policy.

There is thereby generated a hash chain (or "Authenticity Keychain") from private keys in a manner similar to SSL (insofar as there is a root key and intermediary keys). When an app that uses the Agent SDK is installed, an AES Public-Private keypair is generated (using a Diffie-Hellman key exchange). This is the root of the Keychain. This begins a registration process, where the user's public key is sent to the server and the server's public key is returned. The generation of the first key embodies and provides a reusable proof that a device has authenticated with a server before. This has both security and privacy advantages. Subsequent keys have numerous uses, including Authenticating REST calls, Authenticating with the Gateway, Generation of a Session access token which is used to randomise Server Side geofence queries, Digitally Signing Messages from the Gateway, Digitally signing messages that originate on the device over the Mesh, Confirming signatures and Message digests of Policies, etc.

The subsequent device connection and discovery process leads to the passing of the public key in order to deliver presence and data to other devices. When a key is hashed it forms a new key, and this second key is used for further uses, such as Representational State Transfer (REST) calls. This second key is hashed, forming a new key for WSS Gateway authentication, and the third key in the chain. This system might be seen as being somewhat analogous to SSL certificates; a Key gets generated by the registry (akin to the root certificate). This key is progressively hashed multiple times to create additional levels of security (aka a keychain). A new embodiment of the key is therefore created for additional phases of activity. For example, a key allows for the sending of messages onto a mesh, or for the connection to the gateway for access to the live stream (in the form of a "realtime streaming key") or for the signing of the messages. A key thus generated may therefore be exchanged with the server prior to the performance of a particular action. The keychain also has a timeline function. Keys may be revoked. Keys may also be rotated.

Each key is hashed—you can use a new seed or form a new key. Likewise, contact details in the form of a device's unique ID may be generated in the form of a temporary or session-based ID may also be hashed and may be discarded when the session is complete. This serves to prevent the system from tracking the movement of devices and the people who are carrying them. Likewise, when the user address book contacts on the device are sent to server, they are hashed, so Personally Identifiable Information (PII) is not sent and is moreover not exposed on the server.

This aspect of the system therefore has the technical advantages of providing a high level of privacy and a correspondingly high level of data integrity.

For example, on registration of new mobile device, an ECDH keypair is generated. A private key is stored in the device's KeyStore or TPM and protected by the user's mobile device identity (password and/or biometric). The Public key is sent to the Server platform, along with the user identity and the device UUID. The server generates a pseudo-random number (nonce) value, encrypts it with AES encryption, using the shared secret derived from the servers Private Key and the Devices' Public key, and returns the encrypted value and the plain text value to the device with its public key.

The mobile device generates a shared secret from its Private Key and the servers public key and decrypts the AES encrypted value. If the unencrypted value matches the plan text, the device posts a success message back to the server and the record is persisted.

If a success message is not received within "x" mins (for example, 15 mins), the user's registration record is deleted.

If the post message is acknowledged as received by the server, the mobile device next generates a series of hashes (SHA-256), a hash chain, where the result of each previous value is used as the input of the next, starting from the main shared secret. This effectively creates a dictionary of shared secrets that can be used for various encryption and hashing/digital signature functions.

Each hash uses a randomly generated salt. The salts are stored locally in a hierarchy that corresponded to the hash chain. The higher order of the chain, closer to the master shared secret, are used for more secure transactions, such as device registration. Those at the lower order of the chain are used for more common operations, such as websocket authentication. The hierarchy of salts is encrypted with ASE encryptions using the master key and stored locally on the device.

Each key in the chain is used for one purpose only; for example, Session Authentication, Message Signatures, Message Encryption, Websocket Authentication.

Using a chain facilitates easier, thus more frequent key rotation. On Key rotation, the Salt dictionary is unencrypted and new hash chain is derived. The Salts do not need to be kept private, just their order in the chain. If the salt hierarchy is lost or compromised, the master shared secret can be used to reregister and generate a new chain and salt hierarchy.

Policies have actions and triggers and apply to groups. Policies contain digitally signed claims in the same format as Java Web Tokens. A policy is a contract (Schema) with values (Signed Claims) that is also signed. Bitfields are used in the Private Claims section of the JWT format, for permissions. Policies use HS256 (HMAC with SHA-256) so we use a value in our hash credential chain fir each policy type. The specific attributes of a policy is defined in a JSON schema. A master dictionary of polices for each user/device is maintained on the server. The full policy dictionary is digitally signed. The schema of each devices policy (JSON schema) is available on an endpoint.

Interoperability

Preferably, an interface is provided, which allows interoperability with implemented frameworks. Preferably, device interoperability is achieved via MDNS. Preferably, two incompatible systems are bridged by local Wi-Fi. Preferably, a device acts as a hotspot permitting others to connect and exchange data with and through the hotspot.

Regarding device interoperability, that is done via MDNS according to a further aspect of the present invention—local Wi-Fi, such as platform Wi-Fi, allows for the two incompatible systems to be bridged. In some instances, a device is made to act as a hotspot—allowing others to connect and exchange date with and through the hotspot. Likewise, an IoT gateway could provide a hotspot and devices could communicate with each other through the hotspot.

The invention claimed is:

1. A method for establishing and operating a resilient and reliable ad-hoc communication network of heterogeneous end devices, comprising the steps:
   sending a connection request signal by respectively each end device;
   establishing pairwise connection links between at least a selection of the end devices under usage of the connection request signals thereby creating the ad-hoc communication network wherein Domain Name System-Service Discovery (DNS-SD) provides the service discovery functionality in the network, which is a peer-to-peer network, characterised in that:
   a policy is applied, providing a set of rules indicating the discovery and connection criteria for establishing pairwise connection links and routing; as well as
   operating an underlying real-time information streaming network platform using the created ad-hoc communication network; and
further characterised in that sending the connection request signal is performed using browsing and/or advertising wherein a device can advertise and browse at the same time and wherein the device chooses to advertise or browse using Evolutionary Game Theory (EGT) to categorize whether a device should operate on a selfish or altruistic strategy whereby a fitness function is defined to model a game for the network, the fitness function describing a payoff each device will receive for the strategy it follows, wherein an input to define the fitness function is at least one of battery strength and/or signal strength to devices, or maturity of the network.

2. The method according to claim 1, characterised in that at least one end device is formed by a server providing information items to be shared among further end devices.

3. The method according to claim 1, characterised in that information items are forwarded between the end devices, wherein the forwarding is performed under consideration of information item characteristics and/or context information provided using at least one end device.

4. The method according to claim 3, characterised in that information item characteristics comprise a time-stamp, a version number, a file size, an expiry date and/or a priority information.

5. The method according to claim 3, characterised in that context information comprises a location information, a movement information, signal strength, a personal user information, a user input, a bandwidth, a hardware resource, a communication restriction and/or an end device configuration.

6. The method according to claim 1, characterised in that the set of rules indicating the connection criteria describes a bandwidth, an operating system, an end device configuration, a distance information and/or location information.

7. The method according to claim 1, characterised in that the real-time information streaming network platform provides control instructions for mutual data exchange between pairwise end devices.

8. The method according to claim 1, characterised in that the real-time information streaming network platform provides end device authentication functionality, message encryption functionality, certificate management functionality, password management functionality, hashing functionality and/or signature functionality.

9. The method according to claim 1, characterised in that an interface is provided, which allows interoperability with implemented frameworks.

10. The method according to claim 1, characterised in that the method is implemented using at least one communication protocol.

11. The method according to claim 1, characterised in that at least a selection of provided method steps is performed iteratively thereby forming a dynamic ad-hoc network on demand.

12. The method according to claim 1, characterised in that connections are anonymized and/or geofenced and comprise a unique identifier; optionally wherein a one-time password is used to register and then link the devices.

13. The method according to claim 1, characterised in that the ad-hoc network can reconstitute and reconfigure itself, utilising a plurality of devices selected from mobile devices, static beacons, and in situ routers.

14. The method according to claim 1, characterised in that hosts on the network are assigned IP addresses that uniquely identify them to other devices on the same network.

15. The method according to claim 1, characterised in that location mapping is undertaken at the edge, providing the following ways to map location: GPS/aGPS, Beacon, Connection Mapping, and Collective Positioning.

16. The method according to claim 1, further comprising an in-memory database to keep track of device presence and optionally comprising a consistent hashing algorithm to scale redistribution horizontally.

17. The method according to claim 1, wherein device interoperability is achieved via MDNS, optionally wherein two incompatible systems are bridged by local Wi-Fi or wherein a device acts as a hotspot permitting others to connect and exchange data with and through the hotspot.

18. The method according to claim 1, wherein software required to operate the method is provided as an application downloadable onto a mobile device, wherein the application incorporates an Assessment and Deployment Kit (ADK) that enables the generation of public keys on both a server side and the device side.

19. An end device arranged to operate the method according to claim 1.

20. A system arrangement for establishing and operating a resilient and reliable ad-hoc communication network of heterogeneous end devices, comprising:
   interfaces arranged to send a connection request signal by respectively each end device;
   a linking unit arranged to establish pairwise connection links between at least a selection of the end devices under usage of the connection request signals thereby creating the ad-hoc communication network wherein DNS-SD provides the service discovery functionality in the network, which is a peer-to-peer network, characterised by
   a selection unit arranged to apply a policy, the policy providing a set of rules indicating the discovery and connection criteria for establishing pairwise connection links and routing,
   at least one processor module arranged to operate an underlying real-time information streaming network platform using the created ad-hoc communication network
   wherein a device can advertise and browse at the same time and wherein the device chooses to advertise or browse using Evolutionary Game Theory (EGT) to categorize whether a device should operate on a selfish or altruistic strategy whereby a fitness function is defined to model a game for the network, the fitness function describing a payoff each device will receive for the strategy it follows, wherein an input to define the fitness function is at least one of battery strength and/or signal strength to devices, or maturity of the network.

21. A computer program product being arranged to perform a method in accordance with claim 1, when being executed on a computer.

\* \* \* \* \*